US007356457B2

(12) United States Patent
Pinkham et al.

(10) Patent No.: US 7,356,457 B2
(45) Date of Patent: Apr. 8, 2008

(54) MACHINE TRANSLATION USING LEARNED WORD ASSOCIATIONS WITHOUT REFERRING TO A MULTI-LINGUAL HUMAN AUTHORED DICTIONARY OF CONTENT WORDS

(75) Inventors: Jessie E. Pinkham, Bellevue, WA (US); Martine M. S. A. Smets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 10/376,743

(22) Filed: Feb. 28, 2003

(65) Prior Publication Data

US 2004/0172235 A1     Sep. 2, 2004

(51) Int. Cl.
*G06F 17/28* (2006.01)
(52) U.S. Cl. .......................................................... 704/2
(58) Field of Classification Search .................. 704/2
See application file for complete search history.

(56) References Cited

U.S. PATENT DOCUMENTS

| | | | | |
|---|---|---|---|---|
| 4,800,522 A | * | 1/1989 | Miyao et al. ................... | 704/2 |
| 4,914,590 A | * | 4/1990 | Loatman et al. ................ | 704/8 |
| 5,128,865 A | | 7/1992 | Sadler ............................ | 704/2 |
| 5,267,156 A | | 11/1993 | Nomiyama .................... | 704/10 |
| 5,386,556 A | * | 1/1995 | Hedin et al. ..................... | 707/4 |
| 5,418,717 A | | 5/1995 | Su et al. ........................... | 704/9 |
| 5,477,451 A | * | 12/1995 | Brown et al. ................... | 704/9 |
| 5,510,981 A | | 4/1996 | Berger et al. ................... | 704/2 |
| 5,541,836 A | | 7/1996 | Church et al. .................. | 704/7 |
| 5,850,561 A | * | 12/1998 | Church et al. ............... | 715/532 |
| 5,867,811 A | | 2/1999 | O'Donoghue ................... | 704/1 |
| 5,907,821 A | | 5/1999 | Kaji et al. ....................... | 704/4 |
| 6,041,293 A | | 3/2000 | Shibata et al. ................. | 704/4 |
| 6,092,034 A | | 7/2000 | McCarley et al. .............. | 704/2 |
| 6,236,958 B1 | | 5/2001 | Lange et al. .................... | 704/8 |
| 6,278,967 B1 | | 8/2001 | Akers et al. .................... | 704/2 |

(Continued)

OTHER PUBLICATIONS

H. Ney, F.J. Och, S. Vogel, 'The RWTH System for Statistical Translation of Spoken Dialogues', Proceedings of the First International Conference on Human Language Technology Research, San Diego, Mar. 18-21, 2001.*

(Continued)

*Primary Examiner*—David Hudspeth
*Assistant Examiner*—Justin W. Rider
(74) *Attorney, Agent, or Firm*—Theodore M. Magee; Westman, Champlin & Kelly, P.A.

(57) ABSTRACT

A method and computer-readable medium are provided that perform a series of steps associated with machine translation. These steps include using a first text in a first language and a second text in a second language, to produce an association list where words in the first language are associated with words in the second language. A first syntactic structure for a sentence from the first text is aligned with a second syntactic structure for a sentence in the second text based on the association list without referring to a bilingual dictionary of content words. The association list is also used during translations. Specifically, a word in the first language is translated into a word in the second language based on an entry in the association list without referring to a bilingual dictionary that contains content words. Thus, training and translation are performed without the need for a bilingual dictionary of content words.

16 Claims, 3 Drawing Sheets

U.S. PATENT DOCUMENTS

| | | | |
|---|---|---|---|
| 6,721,967 B2 | 4/2004 | Braxton | 4/664 |
| 6,804,637 B1 | 10/2004 | Tokuda et al. | 704/2 |
| 6,885,985 B2 | 4/2005 | Hull | 704/2 |
| 7,020,601 B1 | 3/2006 | Hummel et al. | 704/2 |
| 7,107,204 B1 | 9/2006 | Liu et al. | 704/2 |
| 2002/0107683 A1 | 8/2002 | Eisele | 704/2 |
| 2002/0123877 A1 | 9/2002 | Xun | 704/2 |
| 2002/0198701 A1 | 12/2002 | Moore | 704/2 |
| 2003/0023422 A1 | 1/2003 | Menezes et al. | 704/2 |
| 2003/0023423 A1 | 1/2003 | Yamada et al. | 704/2 |
| 2003/0061023 A1 | 3/2003 | Menezes et al. | 704/4 |
| 2003/0204400 A1 | 10/2003 | Marcu et al. | 704/251 |
| 2004/0098247 A1 | 5/2004 | Moore | 704/4 |
| 2004/0172235 A1 | 9/2004 | Pinkham | 704/2 |

OTHER PUBLICATIONS

P. Charoenpornsawat, V. Sornlertlamvanich, T. Charoenporn, 'Improving Translation Quality of Rule-based Machine Translation', COLING-02 on Machine translation in Asia—vol. 16, Taipei, Taiwan, Aug. 24-Sep. 1, 2002.*

Martin Kay and Martin Roscheisen, Text-Translation Alignment, Association for Computational Linguistics, 1993.*

U.S. Appl. No. 10/300,309, filed Nov. 20, 2002, Moore.

U.S. Appl. No. 10/173,252, filed Jun. 17, 2002, Moore.

I. Dan Melamed,, "Automatic Construction of Clean Broad-Coverage Translation Lexicons," 2nd Conference of the Association for Machine Translation in the Americas (AMTA '96), 10 pages (1996).

I. Dan Malamed, "Automatic Discovery of Non-Compositional Compounds in Parallel Data," 2nd Conference on Empirical Methods in Natural Language Processing (EMNLP '97), 12 pages (1997).

K. Yamamoto et al., "A Comparative Study on Translation Units for Bilingual Lexicon Extraction," In Proceedings of the Workshops on Data-Driven Machine Translation, 39th Annual Meeting of the Association for Computational Linguistics, pp. 87-94 (2001).

F. Smadja et al., "Translating Collocations for Bilingual Lexicons: A Statistical Approach," Computational Linguistics, 22(1): 1-38 (1996).

J. Kupiec, "An Algorithm for Finding Noun Phrase Correspondences in Bilingual Corpora," In Proceedings of the 31st Annual Meeting of the Association for Computational Linguistics, pp. 17-22 (1993).

Y. Al-Onaizan and K. Knight. 2002. Named entity translation: extended abstract. In advance papers of Human Language Technology 2002, San Diego, CA. pp. 111-115.

N. Chinchor. 1997. MUC-7 named entity task definition. In Proceedings of the 7th Message Understanding Conference.

I. Dagan and K. Church. 1997. Termight: coordinating humans and machines in bilingual terminology acquisition. Machine Translation, 12:89-107.

T. Dunning. 1993. Accurate methods for the statistics of surprise and coincidence. Computational Linguistics, 19(1):61-74.

J. Kupiec. 1993. An algorithm for finding noun phrase correspondences in bilingual corpora. In Proceedings of the 31st Annual Meeting of the Association for Computational Linguistics. Columbus Ohio, pp. 17-22.

I.D. Melamed. 2000. Models of Translational Equivalence. Computational Linguistics, 26(2):221-249.

R. C. Moore. 2001. Towards a simple and accurate statistical approach to learning translation relationships among words. In Proceedings of the Workshop on Data-Driven Machine Translation, 39th Annual Meeting Association for Computational Linguistics, Toulouse, France, pp. 79-86.

S. Richardson, W.B. Dolan, M. Corston-Oliver and A. Menezes. 2001. Overcoming the customization bottleneck using example-based MT. In Proceedings of the Workshop on Data-Driven Machine Translation, 39th Annual Meeting of the Association for Computational Linguistics, Toulouse, France, pp. 9-16.

D. Wu. 1995. Grammarless extraction of phrasal translation examples from parallel texts. In Proceedings of TMI-95, Sixth International Conference on Theoretical and Methodological Issues in Machine Translation, Leuven, Belgium, vol. 2, pp. 354-372.

I. D. Melamed. 1995. Automatic evaluation and uniform filter cascades for inducing N-Best translation lexicons. In proceedings of the Third Workshop on Very Large Corpora, pp. 184-198, Cambridge, MA.

A. Kumano and H. Hirakawa. 1994. Building an MT dictionary from parallel texts based on liguistics and statistical information. In Proceedings of the 15th International Conference on Computational Linguistics, pp. 76-81, Kyoto, Japan.

W. Gale and K. Church. 1991. Identifying word correspondences in parallel texts. In Proceedings Speech and Natural Language Workshops, pp. 152-157, Asilomar, CA. DARPA.

P. Fung. 1995. A pattern matching method for finding noun and proper noun translations from noisy parallel corpora. In Proceedings of the 33rd Annual Meeting, pp. 236-243, Boston, MA. Association for Computational Linguistics.

D. Wu and X. Xia. 1994. Learning an English-Chinese lexicon from parallel corpus. In Proceedings of the 1st Conference of the Association for Machine Translation in the Americas, pp. 206-213, Columbia, MD.

Lars Ahrenberg et al., "A Simply Hybrid Aligner for Generating Lexical Correspondence in Parallel Texts," Proccedings of COLING '98/ACL '98.

Mihoko Kitamura et al., "Automatic Extraction of Word Sequence Correspondences in Parallel Corpora," Proceedings of the Fourth Annual Workshop on Very Large Corpora, pp. 79-87, 1996.

I. Dan Malamed, "A Word-to-Word Model of Translational Equivalence," Proceedings of the 35th Conference of the Association for Computational Linguistics, pp. 490-497, 1997.

Pascale Fung et al., "K-Vec: A New Approach for Aligning Parallel Texts," Proceedings from the 15th International Conference on Computational Linguistics, pp. 1096-1102, 1994.

Robert C. Moore, "Learning Translations of Named-Entity Phrases from Parallel Corpora," Microsoft Research.

Dekai Wu, "Aligning a Parallel English-Chinese Corpus Statistically with Lexical Criteria," Proceedings of the 32nd Annual Meeting on Association for Computational Linguistics, pp. 80-87, 1994.

Stanley F. Chen, "Aligning Sentences in Bilingual Corpora Using Lexical Information," Proceedings of the 31st Annual Meeting on Association for Computational Linguistics, pp. 9-16, 1993.

William A. Gale, et al., "A Program for Aligning Sentences in Bilingual Corpora," 1993, Association for Computational Linguistics.

Peter F. Brown et al., "Aligning Sentences in Parallel Corpora," Proceedings of the 29th Annual Meeting on Association for Computational Linguistics, pp. 169-176, 1991.

Ido Dagan et al., "Robust Bilingual Word Alignment for Machine Aided Translation," In Proccedings of the Workshop on Very Large Corpora: Academic and Industrial Perspectives, pp. 1-8, 1993.

I. Dan Melamed, "Automatic Evaluation and Uniform Filter Cascades for Inducing N-Best Translation Lexicons," Proceedings of the Third Workshop on Very Large Corpora, pp. 184-198, 1995.

Reinhard Rapp, "Automatic Identification of Word Translations from Unrelated English and German Corpora", ACL. 1999.

Timothy Meekhof, David Clements, "L&H Lexicography Toolkit for Machine Translation", AMTA 2000.

Pascale Fung, Lo Yuen Yee, "An IR Approach for Translating New Words from Nonparallel, Comparable Texts", ACL 1998.

William A. Gale, Kenneth W. Church, David Yarowsky, "A Method for Disambiguating Word Senses in a Largo Corpus", AT&T, Kluwer Academic Publishers, 1993.

Mona Diab, Steve Finch, "A Statistical Word-Level Translation Model for Comparable Corpora", Proceedings of the Conference on Content-Based Multimedia Information Access (RIAO), 2000.

* cited by examiner

MACHINE TRANSLATION USING LEARNED WORD ASSOCIATIONS WITHOUT REFERRING TO A MULTI-LINGUAL HUMAN AUTHORED DICTIONARY OF CONTENT WORDS

BACKGROUND OF THE INVENTION

The present invention relates to machine translation. More specifically, the present invention relates to training and using machine translation systems.

Machine translation systems are systems that receive an input in one language, translate it, and provide an output in the second language. A key component in this translation is a human-authored bilingual dictionary, which includes human-authored entries that provide direct translations from a content word in one language to a content word in the other language. In general, it has been thought that such bilingual dictionaries are critical to forming a functioning machine translation system and that without them the automatic translation will not be accurate.

Because of the perceived need for human-authored bilingual dictionaries, the prior art has expended vast resources of time and money to develop such dictionaries and to keep them up to date. The fact that designers of machine translation systems continue to incur this high expense shows that those skilled in the art believe such bilingual dictionaries to be critical to obtaining accurate machine translations.

SUMMARY OF THE INVENTION

A method and computer-readable medium are provided that perform a series of steps associated with machine translation. These steps include using aligned bi-texts, i.e., a first text in a first language and a second text in a second language, to produce an association list where words in the first language are associated with words in the second language. Contrary to prior art, the associations also include information on part of speech. At training, a first syntactic structure (logical form) for a sentence from the first text is aligned with a second syntactic structure (logical form) for a sentence in the second text based on the association list without referring to a human-authored bilingual dictionary of content words. The association list is also used during translations. Specifically, a word in the first language is translated into a word in the second language based on an entry in the association list without referring to a bilingual dictionary that contains content words. Thus, training and translation are performed without the need for a human-authored bilingual dictionary of content words.

DETAILED DESCRIPTION OF ILLUSTRATIVE EMBODIMENTS

The discussion of FIGS. 1 and 2 below is simply to set out illustrative environments in which the present invention can be used. The invention may be used in other environments as well.

Figure 1:
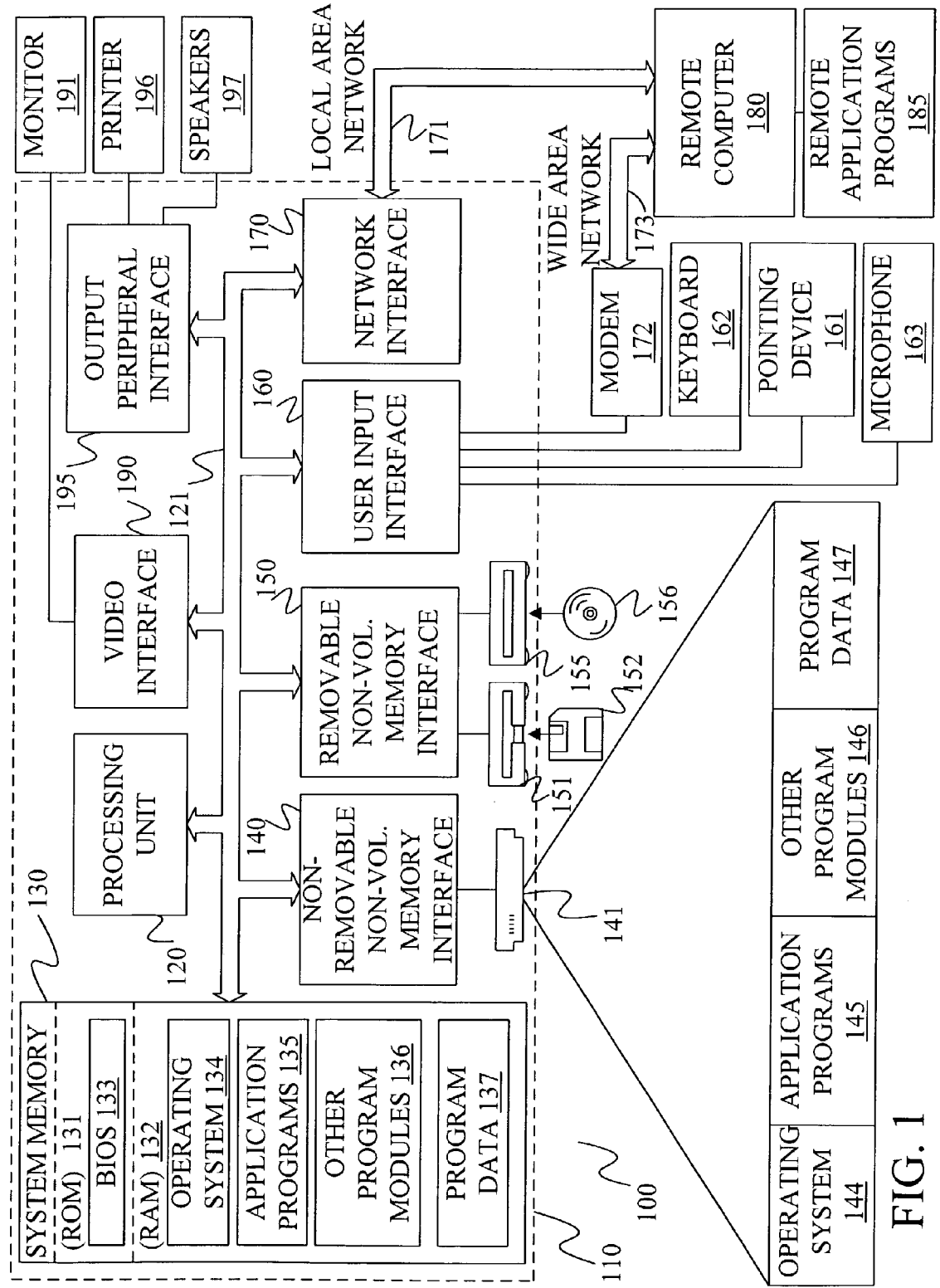
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
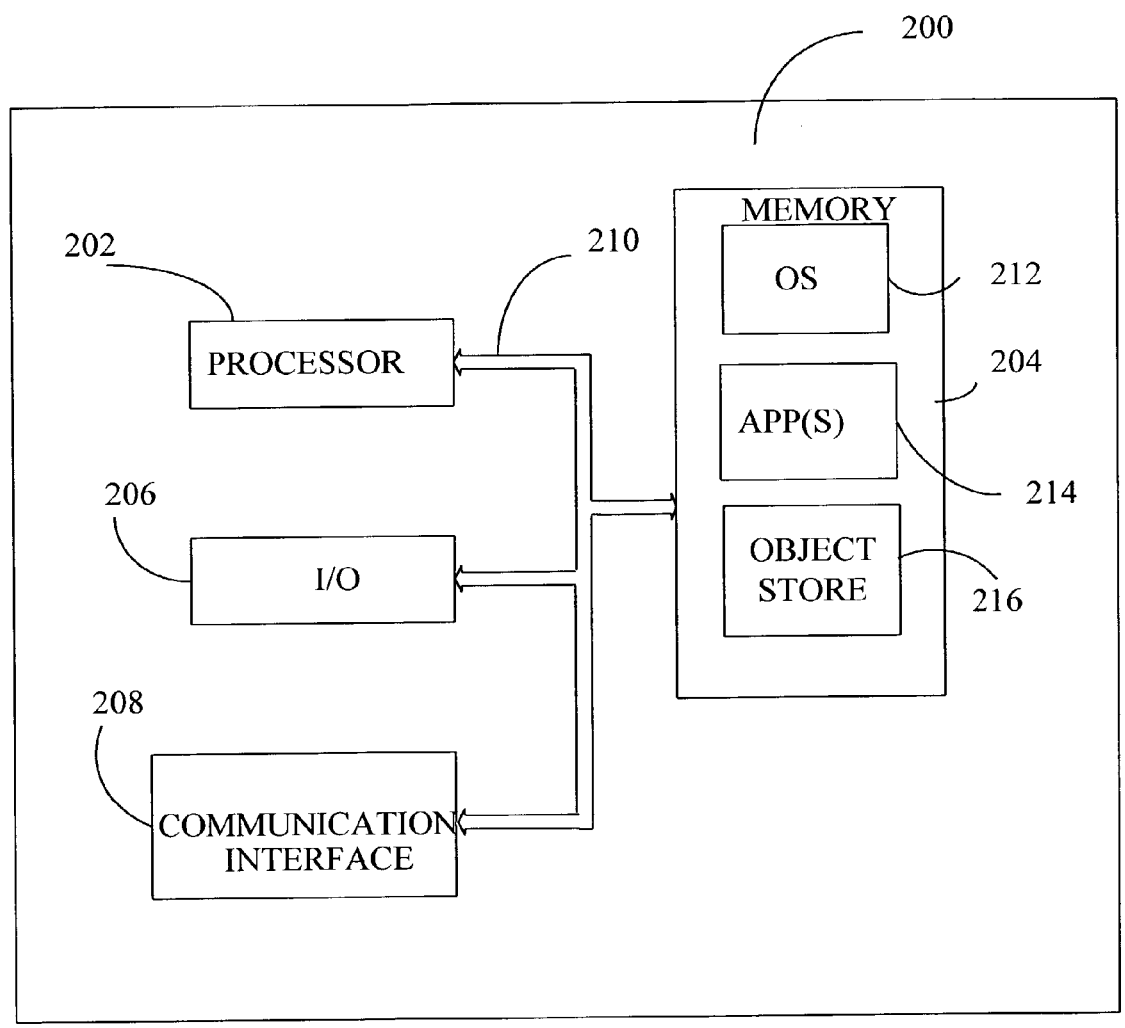
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
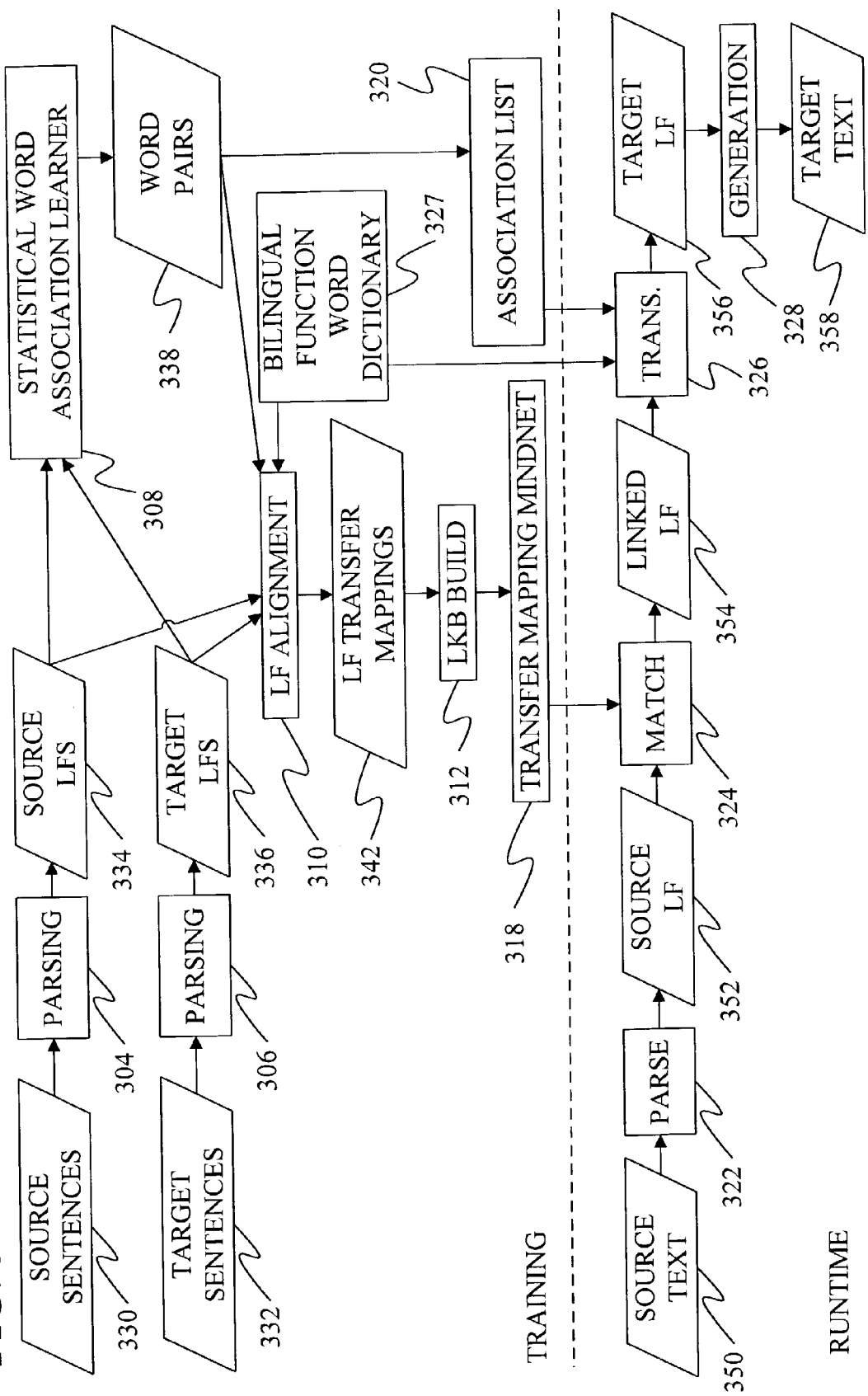
FIG. 3 is a more detailed block diagram of a general machine translation architecture in which the present invention can be used.

While logical forms are not required for the present invention, they are discussed in relation to the machine translation architecture shown in FIG. 3. Therefore, prior to discussing that architecture in greater detail, a brief discussion of a logical form will be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological and syntactic analysis on an input text to produce conventional phrase structure analyses augmented with grammatical relations including parts of speech. Syntactic analyses undergo further processing in order to derive logical forms, which are graph structures that describe labeled dependencies among content words in the textual input. Logical forms normalize certain syntactical alternations, (e.g., active/passive) and resolve both intrasentential anaphora and long distance dependencies.

Specifically, a logical relation consists of two words joined by a directional relation type (e.g., Part, Time, Hypernym, LogicalSubject, Cause, Domain, Location, Manner, Material, Means, Modifier, Possessor, Purpose, Quasihypernym, Synonym, LogicalObject, and User). A logical form is a graph of connected logical relations representing a single textual input, such as a sentence. It minimally consists of one logical relation. The logical form portrays structural relationships (i.e., syntactic and semantic relationships), particularly argument and/or adjunct relation between important words in an input string.

In one illustrative embodiment of the machine translation architecture, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations.

FIG. 3 is a block diagram of a machine translation system 300, which defines one embodiment of an environment for the present invention. System 300 includes parsing components 304 and 306, statistical word association learning component 308, logical form alignment component 310, lexical knowledge base building component 312, transfer mapping database 318 and association list 320. During run time, the system utilizes parsing component 322, matching component 324, transfer component 326, bilingual function word dictionary 327 and generation component 328.

In one illustrative embodiment, a bilingual corpus is used to train the system. The bilingual corpus includes aligned translated sentences (e.g., sentences in a source or target language, such as English, aligned with their translations in the other of the source or target language, such as Spanish or French, etc.). During training, sentences are fed from the aligned bilingual corpus into system 300 as source sentences 330 (the sentences to be translated), and as target sentences 332 (the translation of the source sentences). Parsing components 304 and 306 parse the sentences from the aligned bilingual corpus to produce syntactic structures such as logical forms resulting in source logical forms 334 and target logical forms 336. During parsing, the words in the sentences are converted to normalized word forms (lemmas) and their parts of speech are identified. The term "lemma" as used herein refers to a stem or root word for a content word. For example, "sleep" is the lemma for the surface forms "sleep", "sleeping" and "slept." It should also be noted, however, that while one embodiment of the present invention is applied to content word lemmas, in another embodiment, the invention can be applied to surface forms instead, but performance may suffer somewhat. In any case, the lemmas and parts of speech are then fed into statistical word association learning component 308.

Learning component 308 attempts to find words in the target and source sentences that are likely translations of each other by performing statistical analysis using the source and target logical forms. These possible translations are referred to as word associations and are initially stored as word pairs 338.

To identify the word associations, learner 308 computes statistical word association scores for individual word pairs in the aligned, parsed, bilingual corpus. Any word association metric can be used that provides a score indicative of a statistical word association between word pairs in the training corpus. Under one embodiment, the present invention uses the log-likelihood-ratio statistic discussed by Dunning in Dunning, *Accurate Methods for the Statistics of Surprise and Coincidence, Computational Linguistics,* 19(1):61-74 (1993). This statistic is used to compare the overall frequency of a word or lemma in language 1 ($WL_1$) in the training data to the frequency of a word or lemma in language 1 ($WL_1$) given a word or lemma in language 2 ($WL_2$) (i.e., the frequency with which $WL_1$ occurs in sentences of L1 that are aligned with sentences of L2 in which $WL_2$ occurs). Applying the log-likelihood-ratio therefore provides a measure of the likelihood that an observed positive association between $WL_1$ and $WL_2$ is not accidental.

The list of word pairs for which association scores are computed can also be pruned. In other words, the process of computing the word association scores generates association scores for a large number of word (or lemma) pairs for a large training corpus. Therefore, in one illustrative embodiment, the set of word pairs is pruned to restrict further processing to those pairs having at least some chance of being considered as translation pairs. One illustrative heuristic sets this threshold to be the degree of association of a pair of words or lemmas that have one co-occurrence, plus one other occurrence each.

Word pairs 338 are placed into an association list 320 that is used during machine translation as discussed further below. Each entry for the word pairs in association list 320 also includes a part of speech for each word in the entry. Thus, association list 320 represents a machine-created bilingual dictionary.

The word pairs 338 are provided to logical form alignment component 310 along with a bilingual function word dictionary 327, source logical forms 334 and target logical forms 336. Bilingual function word dictionary 327 contains function words such as prepositions, conjunctions, pronouns and articles. Component 310 first establishes tentative lexical correspondences between nodes in the source and target logical forms 334 and 336, respectively. This is done based on the associations provided in word pairs 338 and function word dictionary 327. However, it does not require a human-authored bilingual dictionary of content words, which are words that are not prepositions, conjunctions, pronouns or articles. Note that in the prior art, a human-authored bilingual dictionary of content words was used with the associations of the word pairs to perform alignment and it was generally thought that the human-authored bilingual dictionary of content words was critical to achieving proper alignment since there was no human control over the associations generated by statistical learner 308. Thus, the human-authored bilingual dictionary of the prior art was given equal weight to the associations generated by the statistical learner because it was believed that the statistical learner was more prone to error than the human-authored bilingual dictionary, and that the information from the bilingual dictionary was essential. By removing the human-authored bilingual dictionary of content words during the alignment step, the present invention runs counter to the teachings of the prior art.

After establishing possible correspondences using the word pairs 338 and function word dictionary 327, alignment component 310 aligns logical form nodes according to both lexical and structural characteristics and creates logical form transfer mappings 342.

The transfer mappings are filtered based on a frequency with which they are found in the source and target logical forms 334 and 336 and are provided to a lexical knowledge base building component 312.

In one example, if the transfer mapping is not seen at least twice in the training data, it is not used to build transfer mapping database 318, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 312 builds transfer mapping database 318, which contains transfer mappings that basically link logical forms, or parts thereof, in one language, to logical forms, or parts thereof, in the second language. With transfer mapping database 318 thus created, system 300 is now configured for runtime translations.

During runtime, a source sentence 350 to be translated is provided to analysis component 322. Analysis component 322 receives source sentence 350 and creates a source logical form 352 based upon the source sentence input.

The source logical form 352 is provided to matching component 324. Matching component 324 attempts to match the source logical form 352 to logical forms in the transfer mapping database 318 in order to obtain a linked logical form 354. Multiple transfer mappings may match portions of source logical form 352. Matching component 324 searches for the best set of matching transfer mappings in database 318 that have matching lemmas, parts of speech, and other feature information. Larger (more specific) transfer mappings may illustratively be preferred to smaller (more general) transfer mappings. Among mappings of equal size, matching component 324 may illustratively prefer higher frequency mappings. Mappings may also match overlapping portions of the source logical form 352 provided that they do not conflict in any way.

After an optimal set of matching transfer mappings is found, matching component 324 creates links on nodes in the source logical form 352 to copies of the corresponding target logical form segments received by the transfer mappings, to generate linked logical form 354.

Transfer component 326 receives linked logical form 354 from matching component 324 and creates a target logical form 356 that will form the basis of the target translation. This is done by performing a top down traversal of the linked logical form 354 in which the target logical form segments pointed to by links on the source logical form 352 nodes are combined. When combining together logical form segments for possibly complex multi-word mappings, the sublinks set by matching component 324 between individual nodes are used to determine correct attachment points for modifiers, etc. Default attachment points are used if needed.

In cases where no applicable transfer mappings are found, the nodes in source logical form 352 and their relations are simply copied into the target logical form 356. Default single word translations may still be found in transfer mapping database 318 for these nodes and inserted in target logical form 356. However, if none are found, translations can illustratively be obtained from association list 320, which was generated during training, and from bilingual function word dictionary 327.

In the prior art, transfer component 326 also relied on a human-authored bilingual dictionary of content words. The present invention does not use such a dictionary but instead only uses association list 320 and function word dictionary 327. Association list 320 provides possible translations for content words and bilingual function word dictionary 327 provides translations for non-content words such as prepositions, conjunctions, pronouns and articles. Function word dictionary 327 is used because many function words are pruned during the formation of the logical forms and as a result, statistical word association learner 308 cannot form word associations for many of the function words.

When identifying possible translations, one embodiment of transfer component 326 first searches association list 320 for an entry that contains the word in the source text and that has the same part of speech as the word in the source text. If there is more than one entry, transfer component 326 applies a set of preference rules that give preference to particular parts of speech for the target word given the part of speech for the source word. For example, one preference rule may be to match the part of speech of the source word so that if the source word were a noun, the entry in association list 320 would have to have a noun for the target word. Another rule may be that if the source word is a verb, the target word should be an adjective.

The resulting target logical form 356 is provided to a generation component 328, which is illustratively a rule-based, application-independent generation component that maps from target logical form 356 to the target string (or output target sentence) 358. Generation component 328 may illustratively have no information regarding the source language of the input logical forms, and work exclusively with information passed to it by transfer component 326. Generation component 328 also illustratively uses this information in conjunction with a monolingual (e.g., for the target language) dictionary to produce target sentence 358. One generic generation component 328 is thus sufficient for each language.

As noted above, the present invention has eliminated the use of a human-authored bilingual dictionary for content words during both training and runtime in machine translation and in its place uses only a machine-generated word association list. Removing the human-authored bilingual dictionary was not considered to be possible under the prior art because it was believed that it would result in inaccurate translations. Thus, the present invention is counter to the prevailing wisdom in machine translation.

Even the present inventors were surprised to find that by removing the human-authored bilingual dictionary, the accuracy of the machine translations actually improved as long as the source text used at runtime contained similar subject matter to the text used to train the translation system. This was an unexpected result and runs counter to the understanding of machine translation found in the prior art.

Although the present invention has been described with reference to particular embodiments, workers skilled in the art will recognize that changes may be made in form and detail without departing from the spirit and scope of the invention.

What is claimed is:

1. A method of translating words in a first language into words in a second language, the method comprising:
    using a first training text in a first language and a second training text in a second language to generate a word association list comprising entries, at least one of the entries comprising a word from the first language and a word from the second language; and
    translating words in the first language into words in the second language based in part on the word association list without referring to a multi-lingual human-authored dictionary of content words.

2. The method of claim 1 further comprising using the word association list to perform an alignment of an element of a sentence in the first training text with an element of a sentence in the second training text.

3. The method of claim 2 wherein performing an alignment comprises not referring to a multi-lingual human-authored dictionary of content words.

4. The method of claim 3 further comprising generating a first logical form for a sentence in the first training text and generating a second logical form for a sentence in the second training text wherein aligning an element of a sentence in the first training text with an element of a sentence in the second training text comprises aligning the first logical form with the second logical form.

5. The method of claim 1 wherein translating a word in the first language into a word in the second language comprises determining a part of speech of a word in the first language and searching for the word and the part of speech in the word association list.

6. The method of claim S wherein searching for the word and the part of speech further comprises searching for a part of speech for a word in the second language.

7. The method of claim 6 wherein the part of speech of the word in the first language matches the part of speech of a word in the second language.

8. A computer-readable storage medium having computer-executable instructions for performing steps comprising:
    identifying associations between words in a first language and words in a second language based on a first text in the first language and a second text in the second language to produce an association list;
    identifying a first syntactic structure for a sentence in a first language, the first syntactic structure comprising at least one part of speech;
    identifying a second syntactic structure for a sentence in a second language, the second syntactic structure comprising at least one part of speech; and
    aligning the first syntactic structure with the second syntactic structure based on the association list without referring to a human-authored bilingual dictionary of content words.

9. The computer-readable storage medium of claim 8 wherein the association list comprises a set of entries, at least one of the entries comprising a single word from the first language and a single word from the second language.

10. The computer-readable storage medium of claim 9 wherein the computer-executable instructions perform further steps comprising translating a sentence in the first language into a sentence in the second language based on the association list.

11. The computer-readable storage medium of claim 10 wherein translating comprises not referring to a human-authored bilingual dictionary of content words.

12. The computer-readable storage medium of claim 10 wherein at least one entry in the association list comprises a single word from the first language, a part of speech for the single word from the first language, a single word from the second language and a part of speech for the single word from the second language.

13. The computer-readable storage medium of claim 12 wherein translating a sentence in the first language into a sentence in the second language comprises searching for an entry in the association list that contains a word from the sentence in the first language.

14. The computer-readable storage medium of claim 13 wherein searching for an entry further comprises searching for an entry that contains the part of speech for the word from the sentence in the first language.

15. The computer-readable storage medium of claim 14 wherein searching for an entry further comprises searching for an entry that contains a particular part of speech for a word from the second language.

16. The computer-readable storage medium of claim 15 wherein the particular part of speech for a word from the second language is the same as the part of speech for the word from the sentence in the first language.

* * * * *

UNITED STATES PATENT AND TRADEMARK OFFICE
CERTIFICATE OF CORRECTION

| | | |
|---|---|---|
| PATENT NO. | : 7,356,457 B2 | Page 1 of 1 |
| APPLICATION NO. | : 10/376743 | |
| DATED | : April 8, 2008 | |
| INVENTOR(S) | : Jessie E. Pinkham et al. | |

It is certified that error appears in the above-identified patent and that said Letters Patent is hereby corrected as shown below:

In column 9, line 49, in Claim 6, delete "claim S" and insert -- claim 5 --, therefor.

Signed and Sealed this
Twenty-second Day of February, 2011

David J. Kappos
*Director of the United States Patent and Trademark Office*